US010643076B2

(12) United States Patent
Boss et al.

(10) Patent No.: US 10,643,076 B2
(45) Date of Patent: May 5, 2020

(54) COUNTERFEIT DETECTION

(71) Applicant: International Business Machines Corporation, Armonk, NY (US)

(72) Inventors: Gregory J. Boss, Saginaw, MI (US); John E. Moore, Jr., Brownsburg, IN (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 15/200,329

(22) Filed: Jul. 1, 2016

(65) Prior Publication Data
US 2018/0005043 A1   Jan. 4, 2018

(51) Int. Cl.
*G06K 9/00* (2006.01)
*H04N 7/18* (2006.01)
*H04N 5/225* (2006.01)
*G06Q 30/00* (2012.01)
(Continued)

(52) U.S. Cl.
CPC ....... *G06K 9/00771* (2013.01); *G06K 9/4661* (2013.01); *G06K 9/6215* (2013.01); *G06Q 30/0185* (2013.01); *H04N 5/2256* (2013.01); *H04N 7/183* (2013.01)

(58) Field of Classification Search
CPC .. G06K 9/00771; G06K 9/00; G06Q 30/0185; G06Q 30/00; H04N 5/2256; H04N 7/183; H04N 5/225; H04N 7/18
See application file for complete search history.

(56) References Cited

U.S. PATENT DOCUMENTS

| 5,748,775 A | 5/1998 | Tsuchikawa et al. |
| 6,400,276 B1 * | 6/2002 | Clark ...................... G07F 19/20 340/541 |
| 7,620,266 B2 | 11/2009 | Brown et al. |

(Continued)

FOREIGN PATENT DOCUMENTS

WO   2014079058 A1   5/2014

OTHER PUBLICATIONS

Barribeau, T. "MIT 3D sensor can track transparent, moving objects". Posted Wednesday, Nov. 27, 2013 at 2:21 PM EDT. <http://www.imaging-resource.com/news/2013/11/27/mit-3d-sensor-can-track-transparent-moving-objects>.

(Continued)

*Primary Examiner* — David N Werner
*Assistant Examiner* — Berteau Joisil
(74) *Attorney, Agent, or Firm* — Tihon Poltavets

(57) ABSTRACT

A method includes identifying a first light source in a surveillance coverage area, wherein the first light source is an electronic light source. The method receives a schedule for one or more light source changes for the surveillance coverage area, wherein the one or more light source changes include activating and deactivating the first light source at a particular point in time. The method establishes a first shadow measurement utilizing the first light source and a camera at a first point in time. The method determines a second shadow measurement utilizing the first light source and the camera at a second point in time. Responsive to determining the second shadow measurement does not reach a similarity threshold with the first shadow measurement, the method sends a first notification to a user, wherein the first notification specifies a potential security breach.

17 Claims, 4 Drawing Sheets

(51) Int. Cl.
   *G06K 9/46*         (2006.01)
   *G06K 9/62*         (2006.01)

(56) References Cited

U.S. PATENT DOCUMENTS

| | | |
|---|---|---|
| 8,170,279 B2 | 5/2012 | Ezekiel et al. |
| 8,218,819 B2 | 7/2012 | Cobb et al. |
| 8,587,661 B2 | 11/2013 | McCubbrey |
| 8,744,123 B2 | 6/2014 | Bobbitt et al. |
| 8,934,714 B2 | 1/2015 | Feris et al. |
| 9,123,136 B2 | 9/2015 | Feris et al. |
| 2003/0014647 A1* | 1/2003 | Bourrieres ......... G06K 9/00577 713/185 |
| 2003/0138134 A1* | 7/2003 | Petrich ............... G06K 9/00228 382/118 |
| 2014/0166756 A1* | 6/2014 | Powell ............... G06K 7/10732 235/455 |
| 2017/0132465 A1* | 5/2017 | Kutter ................. G06K 7/1417 |

OTHER PUBLICATIONS

"Mirror illusion—Google Search". Dec. 6, 2015. <https://www.google.co.in/search?q=mirror+illusion&biw=1366&bih=641&noj=1&source=lnms&tbm=isch&sa=X&ved=0ahUKEwjikvyurqPJAhXlm5QKHdPkCqkQ_AUIBygB>.

* cited by examiner

COUNTERFEIT DETECTION

BACKGROUND

The present invention relates generally to camera systems and more particularly to identifying counterfeit occurrences in a camera coverage area.

Typically, camera systems are difficult to manipulate electronically due to extensive security protocols installed to prevent unauthorized access. However, image manipulation as captured by a camera can occur, especially in an area heavily populated by objects. For example, jewelry stores include a vast quantity of light reflective items that are often encased in glass enclosures that further reflect and refract light. The vast quantity of light reflective items paired with the light reflect and refract light glass enclosures allow for image manipulation utilizing, for example, mirrors. A glass enclosure with jewelry items that reflects light appears substantially different than a glass enclosure with no jewelry items. However, mirrors can be strategically placed within the glass enclosure with no jewelry items, such that the image reflected in the strategically placed mirrors include jewelry items from surrounding glass enclosures.

The discovery of the strategically placed mirrors will only be apparent to a person once the person is viewing the physical glass enclosure rather than viewing the glass enclosure as an image captured by the camera. The discovery of the strategically placed mirrors is also delayed due to the fact that such an image manipulation can be created at a time when a person might not be able to view the physical glass enclosure for hours, even days. The person viewing the glass enclosure as captured by the camera does not receive any indication that an image manipulation has occurred in the camera coverage area.

SUMMARY

Embodiments of the present invention include a method, computer program product and computer system for identifying counterfeit occurrences in a surveillance coverage area.

A computer-implemented method includes identifying, by one or more processors, a first light source in a surveillance coverage area, where the first light source is an electronic light source; receiving, by one or more processors, a schedule for one or more light source changes for the surveillance coverage area, where the one or more light source changes include activating and deactivating the first light source at a particular point in time; establishing, by one or more processors, a first shadow measurement utilizing the first light source and a camera at a first point in time; determining, by one or more processors, a second shadow measurement utilizing the first light source and the camera at a second point in time; and responsive to determining the second shadow measurement does not reach a similarity threshold with the first shadow measurement, sending, by one or more processors, a first notification to a user, where the first notification specifies a potential security breach. An advantage provided by this method is that it enables the discovery of counterfeit items within an image captured by a security camera, thereby increasing an ability to detect theft or other fraudulent activity.

A computer program product includes one or more computer readable tangible storage media and program instructions stored on at least one of the one or more storage media, where the program instructions include program instructions to identify a first light source in a surveillance coverage area, where the first light source is an electronic light source. The computer program product includes the program instructions to receive a schedule for one or more light source changes for the surveillance coverage area, where the one or more light source changes include activating and deactivating the first light source at a particular point in time. The computer program product includes program instructions to establish a first shadow measurement utilizing the first light source and a camera at a first point in time. The computer program product includes program instructions to determine a second shadow measurement utilizing the first light source and the camera at a second point in time. The computer program product includes program instructions to, responsive to determining the second shadow measurement does not reach a similarity threshold with the first shadow measurement, send a first notification to a user, where the first notification specifies a potential security breach. An advantage provided by this computer program product is that it enables the discovery of counterfeit items within an image captured by a security camera, thereby increasing an ability to detect theft or other fraudulent activity.

A computer system includes one or more computer processors, one or more computer readable storage media, and program instructions stored on the computer readable storage media for execution by at least one of the one or more computer processors. The computer system includes program instructions to identify a first light source in a surveillance coverage area, where the first light source is an electronic light source. The computer system includes program instructions to receive a schedule for one or more light source changes for the surveillance coverage area, where the one or more light source changes include activating and deactivating the first light source at a particular point in time. The computer system includes program instructions to establish a first shadow measurement utilizing the first light source and a camera at a first point in time. The computer system includes program instructions to determine a second shadow measurement utilizing the first light source and the camera at a second point in time. The computer system includes program instructions to, responsive to determining the second shadow measurement does not reach a similarity threshold with the first shadow measurement, send a first notification to a user, where the first notification specifies a potential security breach. An advantage provided by this computer system is that it enables the discovery of counterfeit items within an image captured by a security camera, thereby increasing an ability to detect theft or other fraudulent activity.

Embodiments of the present invention optionally include identifying, by one or more processors, a second light source in the surveillance coverage area. Embodiments of the present invention optionally include receiving, by one or more processors, a schedule for one or more light source changes for the surveillance coverage area, where the one or more light source changes include activating and deactivating the second light source at a particular point in time. An advantage provided by these embodiments is that they allow for a determination of whether changes with the first light source were due to a counterfeit item or due to another activity. Embodiments of the present invention optionally include establishing, by one or more processors, a third shadow measurement for a third shadow of the first object utilizing the second light source and the camera at the first point in time. Embodiments of the present invention optionally include determining, by one or more processors, a fourth shadow measurement utilizing the second light source and the camera at a second point in time. An advantage provided by these embodiments is that they allow for a confirmation on whether changes with the first light source were due to a counterfeit item or due to another activity. Embodiments of the present invention optionally include, responsive to determining the fourth shadow measurement does not reach a similarity threshold with the third shadow measurement, determining, by one or more processors, whether the second light source is an electronic light source. An advantage provided by these embodiments is that they allow for a determination of whether changes with the second light source were due to a counterfeit item or due to a defect in the second light source.

DETAILED DESCRIPTION

Figure 1:
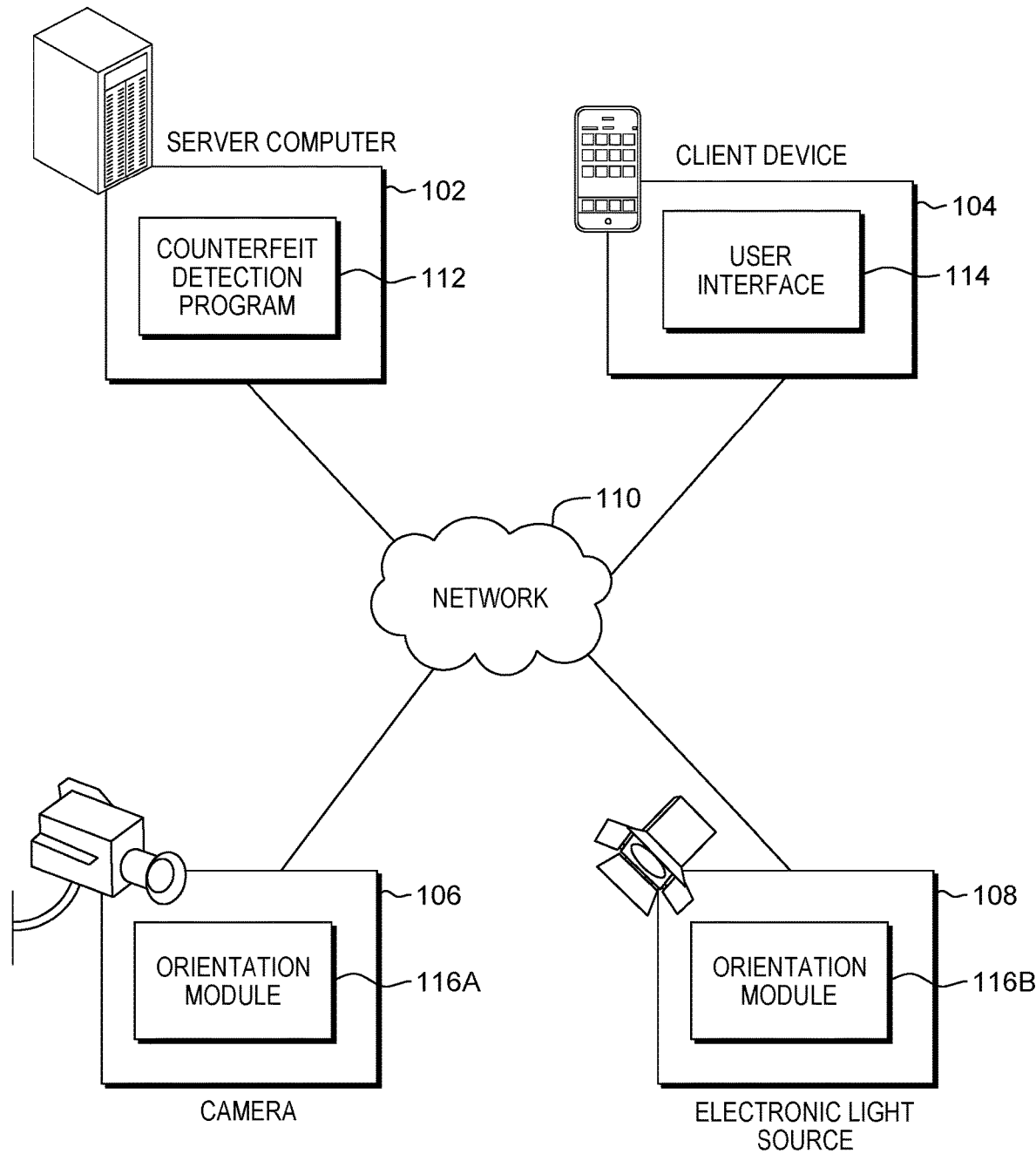
FIG. 1 is a functional block diagram illustrating a distributed data processing environment, in an embodiment in accordance with the present invention.

Example embodiments in accordance with the present invention will now be described in detail with reference to the drawing figures. FIG. 1 is a functional block diagram illustrating a distributed data processing environment. The distributed data processing environment includes server computer 102, client device 104, camera 106, and electronic light source 108, all interconnected over network 110.

Server computer 102 may be a desktop computer, a laptop computer, a tablet computer, a specialized computer server, a smartphone, or any other computer system known in the art. In certain embodiments, server computer 102 represents a computer system utilizing clustered computers and components that act as a single pool of seamless resources when accessed through network 110, as is common in data centers and with cloud computing applications. In general, server computer 102 is representative of any programmable electronic device or combination of programmable electronic devices capable of executing machine-readable program instructions and communicating with other computer devices via a network. In this embodiment, server computer 102 includes counterfeit detection program 112 accessible by client device 104 and any other electronic devices not illustrated in FIG. 1, via network 110.

Client device 104 may be a laptop computer, tablet computer, netbook computer, personal computer (PC), personal digital assistant (PDA), smart phone, wearable device (e.g., smart watch, personal fitness device, personal safety device), or any programmable computer system known in the art with an interactive display. Client device 104 includes user interface 114 and may include a client based counterfeit detection program 112, not illustrated in FIG. 1. In general, client device 104 is representative of any programmable electronic device or combination of programmable electronic devices capable of executing machine-readable program instructions and communicating with users of other electronic devices via network 110. Client device 104 may include components, as depicted and described in further detail with respect to FIG. 5, in accordance with embodiments of the present invention.

Camera 106 represents an electronic device capable of recording video or capturing images. Camera 106 has the ability to capture video or images continuously, at a predetermined interval, or point-in-time. In one embodiment, camera 106 is a digital video camera operating in a closed circuit television (CCTV) environment, where camera 106 is connected to a local network (i.e., network 110). Camera 106 sends data through the local network to a server computer (i.e., server computer 102) located on-site. In this embodiment, counterfeit detection program 112 monitors a single site, where server computer 102 with counter detection program 112 is accessible only through the local network (i.e., network 110). In another embodiment, camera 106 is a digital video camera operating in a broadcasting environment, where camera 106 is connected to an external network (i.e., network 110). Camera 106 sends data through the external network to a server computer (i.e., server computer 102) located off-site. In this embodiment, counterfeit detection program 112 has the ability to receive data from multiple sites and monitor the multiple sites from a centralized location. Camera 106 includes orientation module 116A.

Electronic light source 108 may be an incandescent light unit, a light-emitting diode (LED) light unit, a high intensity discharged (HID) light unit, an LCD light monitor, or any type of electric light connected to at least one processor capable of activating and deactivating the electric light. Counterfeit detection program 112 communicates with electronic light source 108 through network 110, where counterfeit detection program 112 is capable of sending information and receiving data from electronic light source 108. For example, counterfeit detection program 112 has the ability to modulate light intensity for electronic light source 108 by sending electronic light source 108 light intensity parameters. In another example, counterfeit detection program 112 has the ability to receive orientation data for electronic light source 108 from orientation module 116B.

In this embodiment, counterfeit detection program 112 operates in a server-side based setting on server computer 102. In another embodiment, counterfeit detection program 112 can operate in a client-side based setting, for example on client device 104. Counterfeit detection program 112 has the ability to detect counterfeit objects in a surveillance coverage area of camera 106. Counterfeit detection program 112 can identify light sources (e.g., electronic light source 108) and objects in the surveillance coverage area of camera 106. Counterfeit detection program 112 can receive a schedule for light source changes for the surveillance coverage area, where the light source changes includes solar and electronic light sources. For each of the scheduled light source changes, counterfeit detection program 112 can establish base shadow measurements for each of the objects in the surveillance coverage area of camera 106.

Counterfeit detection program 112 can initialize surveillance of the coverage area, where counterfeit detection program 112 utilizes deviations from the established base shadow measurements for the objects to detect counterfeit objects in the surveillance coverage area. Counterfeit detection program 112 can determine shadow measurements for each of the objects in the surveillance coverage area of camera 106 at a scheduled light source change. Subsequent to determining the shadow measurements for each of the objects, counterfeit detection program 112 determines whether a similarity threshold is reached between the determined shadow measurement for an object and the base shadow measurement for the object. Responsive to the similarity threshold being reached, counterfeit detection program 112 can determine shadow measurements for each of the objects in the surveillance coverage area at the next scheduled light source change. Responsive to the similarity threshold not being reached, counterfeit detection program 112 determines whether the light source was a defined electronic light source or a solar light source.

Responsive to the light source not being a defined electronic light source, counterfeit detection program 112 can determine shadow measurements for an object with an electronic light source and determine whether a similarity threshold is reached between the shadow measurements with the electronic light source for the object and the base shadow measurements for the object. Responsive to the light source being a defined electronic light source, counterfeit detection program 112 can send a notification to a user of client device 104, where the notification includes information pertaining to the object with the shadow measurements that do not reach the similarity threshold for the base shadow measurements.

In an alternative embodiment, counterfeit detection program 112 utilizes a nonvisible electronic light source 108 (e.g., infrared light), where camera 106 has the ability to capture the nonvisible electronic light source 108. Counterfeit detection program 112 can utilize various sensors to detect any unexpected light refractions and deflections in the surveillance coverage area.

In yet another embodiment, camera 106 utilizes an ultrasonic distance sensor (not illustrated in FIG. 1) capable of obtaining distances between an identified object in the surveillance coverage area and camera 106. The ultrasonic sensor has the ability to detect any counterfeit item in the surveillance coverage area (i.e., a mirror), whereas a traditional optical or infrared sensor can reflect off the counterfeit item. Counterfeit detection program 112 can perform known image analysis to determine an expected focal length (i.e., distance) between an identified object and camera 106. Counterfeit detection program 112 can compare the determined expected focal length between the identified object and camera 106 to the distance captured by the ultrasonic distance sensor present on camera 106. Responsive to counterfeit detection program 112 determining the two distances deviate beyond a predetermined percentage, counterfeit detection program 112 notifies the user of client device 104 of a possible counterfeit item in the surveillance coverage area.

Client device 104 also includes user interface (UI) 114 and various programs (not shown). Examples of the various programs on client device 104 include: a web browser, an e-mail client, security software (e.g., a firewall program, a geo-locating program, an encryption program, etc.), an instant messaging (IM) application (app), and a communication (e.g., phone) application. In an example, a user of client device 104 can interact with user interface 114, such as a touch screen (e.g., display) that performs both input to a graphical user interface (GUI) and as an output device (e.g., a display) presenting a plurality of icons associated with software applications or images depicting the executing software application. Optionally, a software application (e.g., a web browser) can generate user interface 114 operating within the GUI of client device 104. User interface 114 accepts input from a plurality of input/output (I/O) devices including, but not limited to, a tactile sensor interface (e.g., a touch screen, a touchpad) referred to as a multi-touch display. An I/O device interfacing with user interface 114 may be connected to client device 104, which may operate utilizing wired (e.g., USB port) or wireless network communications (e.g., infrared, NFC, etc.).

In general, network 110 can be any combination of connections and protocols that will support communications among server computer 102, client device 104, camera 106, and electronic light source 108. Network 110 can include, for example, a local area network (LAN), a wide area network (WAN), such as the internet, a cellular network, or any combination of the preceding, and can further include wired, wireless, and/or fiber optic connections. In one embodiment, counter detection program 112 can be a web service accessible via network 110 to a user of client device 104. In another embodiment, counter detection program 112 may be operated directly by a user of server computer 102.

Camera 106 and electronic light source 108 include orientation module 116A and 116B, respectively. Orientation module 116A and 116B utilizes global positioning system (GPS) to identify a latitudinal and longitudinal coordinates for camera 106 and electronic light source 108, respectively. Orientation module 116A and 116B utilizes a compass bearing to identify a direction in which camera 106 and electronic light source 108 is directed towards, respectively. Orientation module 116A and 116B utilizes an electronic level to identify degree of pitch for camera 106 and electronic light source 108, respectively.

Figure 2:
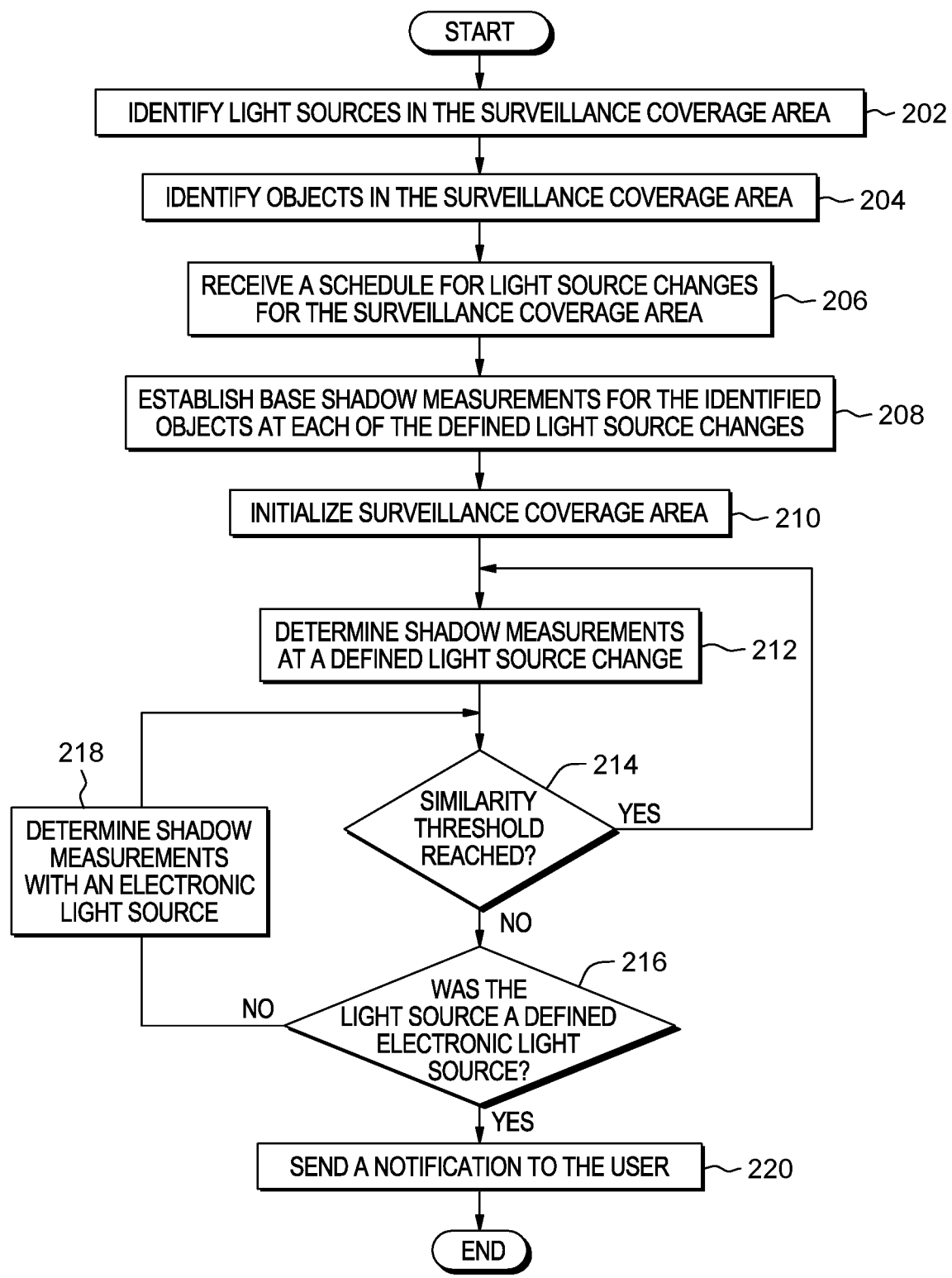
FIG. 2 is a flowchart depicting one embodiment of a counterfeit detection program identifying a counterfeit occurrence in a surveillance coverage area, in accordance with the present invention.

FIG. 2 is a flowchart depicting one embodiment of a counterfeit detection program identifying a counterfeit occurrence in a surveillance coverage area, in accordance with the present invention. As depicted, a method includes identifying (202) light sources in the surveillance coverage area, identifying (204) objects in the surveillance coverage area, receiving (206) a schedule for light source changes for the surveillance coverage area, establishing (208) base shadow measurements for the identified objects at each of the defined light source changes, initializing (210) surveillance of the coverage area, determining (212) shadow measurements at a defined light source change, determining (214) whether a similarity threshold was reached, determining (216) whether the light source was a defined electronic light source, determining (218) shadow measurements with an electronic light source, and sending (220) a notification to the user. In one embodiment, notification procedure manager 110 performs the above-mentioned steps of the method.

The method may commence by identifying (202) light sources in the surveillance coverage area. In this embodiment, counterfeit detection program 112 identifies electronic and solar light sources in the surveillance coverage area. Counterfeit detection program 112 identifies the electronic light sources listed in a directory as being available for the surveillance area and initializes the electronic light sources via an internal network to ensure the available electronic light sources connected to network 110 are available for establishing base shadow measurements for any objects in the surveillance coverage area. Initializing the electronic light sources can include counterfeit detection program 112 sending a signal to the available electronic light sources to power-on and querying each electronic light source for orientation information, where the orientation information is provided by an orientation module. The orientation information includes GPS coordinates, a compass bearing, and a degree of pitch for each of the electronic light sources available.

Upon identifying the electronic light sources, counterfeit detection program 112 identifies possible solar light sources utilizing orientation information from the surveillance camera and solar position information based on the orientation information of the surveillance camera, time of day, and day of the year. A solar position can include a position of the sun and/or the position of the moon at a particular time of day, day of year, and GPS coordinates. The orientation information for the surveillance camera includes GPS coordinates, a compass bearing, and a degree of pitch. Counterfeit detection program 112 can utilize the orientation information of the surveillance camera to identify an expected solar position at a particular time for a particular day of the year. Based on the expected solar position, counterfeit detection program 112 identifies the expected solar position as a light source in the surveillance area.

The method may continue by identifying (204) objects in the surveillance coverage area. In one embodiment, counterfeit detection program 112 utilizes proactive object recognition software, known in the art, to identify possible objects that appear in the surveillance area. The proactive object recognition software can utilize an object database with which potential objects are identified in the surveillance area. The proactive object recognition software can identify potential objects in the surveillance area and counterfeit detection program 112 can query the user to determine whether the potential objects in the surveillance area are correct. Responsive to receiving a confirmation from the user, counterfeit detection program 112 marks the potential objects in the surveillance area as the identified objects in the surveillance area.

In another embodiment, counterfeit detection program 112 utilizes reactive object recognition software, known in the art, to identify possible objects that appear in the surveillance area. Counterfeit detection program 112 can display the surveillance area as captured through the surveillance camera on a client device of the user and receive a user selection from the user that includes a portion of the selected surveillance area being displayed on the client device. Counterfeit detection program 112 can utilize the reactive object recognition software to identify objects in the portion of the selected surveillance area being displayed on the client device. The reactive object recognition software can utilize an object database with which potential objects are identified in the portion of the surveillance area selected by the user. The reactive object recognition software can identify a potential object in the selected portion of the surveillance area and counterfeit detection program 112 can query the user to verify the potential object in the selected portion of the surveillance area. Responsive to receiving a confirmation from the user, counterfeit detection program 112 marks the potential object in the portion of the surveillance area as an identified object in the surveillance area.

The method may continue by receiving (206) a schedule for light source changes for the surveillance coverage area. In this embodiment, counterfeit detection program 112 utilizes a user-defined schedule for light source changes for the surveillance coverage area. Counterfeit detection program 112 has the ability to receive a schedule for light source changes based on user preference, where the user specifies a time of day for the light source change. For example, in the event the surveillance area is a business showroom floor with regular business hours of 9 am to 5 pm, Monday through Friday, the user schedules the light sources changes outside the regular business hours when the business showroom floor is closed. Counterfeit detection program 112 can receive a schedule that activates the electronic light source in the surveillance area on the hour between the hours of 6 pm to 8 am, Monday through Friday, and every hour after Friday 5 pm to Monday 9 am. Alternatively, counterfeit detection program 112 can activate the electronic light source in the surveillance area at random instances outside the regular business hours, therefore eliminating the predictability of the light source changes.

Counterfeit detection program 112 has the ability to receive information specifying which electronic light source is to be activated at the specified time of day. Continuing from the previous example above, between the hours of 6 pm to 8 am, Monday through Friday, the user can specify which electronic light sources are to be activated out of the light sources identified in the surveillance coverage area (202). If there are 2 available light electronic light sources (i.e., light A and light B) the user can, for example, specify to activate only light A at 6 pm on Monday, both light A and light B at 7 pm on Monday, only light B at 8 pm on Monday, and continuing on for every hour of 6 pm to 8 am, Monday through Friday (i.e., outside the regular business hours). Counterfeit detection program 112 has the ability to activate an electronic light source and have the electronic light source powered-on until the next scheduled light source change or counterfeit detection program 112 can activate an electronic light source for a duration required to capture a shadow for objects in the surveillance area (i.e., a flash of light). Alternatively, counterfeit detection program 112 has ability to randomly activate electronic light sources out of the light sources identified in the surveillance coverage area (202) at the specified time of day or at the random instances outside the regular business hours.

In another embodiment, counterfeit detection program 112 has the ability to manipulate surrounding electronic devices to utilize a solar light source identified in the surveillance coverage area (202). For example, counterfeit detection program 112 can signal electronically operated window shades in the surveillance area to open or close a shade to utilize the solar light source (i.e., moonlight or sunlight). Additionally, counterfeit detection program 112 can query an internet based weather service to determine weather conditions to determine whether the identified solar light source is available at the schedule light source change. Responsive to counterfeit detection program 112 determining the weather conditions are optimal for providing a solar light source, counterfeit detection program 112 identifies the solar light source as being available for the schedule light source change. Responsive to counterfeit detection program 112 determining the weather conditions are not optimal for providing a solar light source, counterfeit detection program 112 identifies an alternative electronic light source as being available for the schedule light source change in place of the unavailable solar light source.

The method may continue by establishing (208) base shadow measurements for the identified objects at each of the defined light source changes. Counterfeit detection program 112 establishes base shadow measurements for the objects identified in the surveillance area to which counterfeit detection program 112 can compare future shadow measurements to identify counterfeit objects in a surveillance coverage area. In this embodiment, counterfeit detection program 112 establishes base shadow measurements for the identified object (204) utilizing all possible variations of the identified light sources in the surveillance area (202). For example, counterfeit detection program 112 identifies electronic light sources A, B, and C in the surveillance area and determines there are 8 possible variations for the identified electronic light sources: A, B, C, AB, AC, BC, ABC, and no electronic light source. For the possible variation where there is no electronic light source, counterfeit detection program 112 establishes base shadow measurements utilizing an available solar light source (i.e., sunlight or moonlight) depending on the time of day.

For each variation of the identified electronic light sources, counterfeit detection program 112 identifies one or more shadows created by each of the identified objects in the surveillance area. Counterfeit detection program 112 can utilize object recognition software known in the art to identify shadows created by the identified objects. Counterfeit detection program 112 stores parameters associated with the identified shadows created by the identified objects, where the stored parameters represent the established shadow measurements. The parameters can include point measurements, line segment measurements, measurements for angles created by two line segments, and area measurements for the shadows. A point measurement represents a point where two line segments meet or where two line segments intersect, such as, a point where two shadows meet. An angle where two line segments intersect represents the angle between the two casted shadows, whether the two casted shadows are formed from one identified object or two identified objects. Furthermore, counterfeit detection program 112 can continuously establish base shadow measurements for the variation where there is no electronic light source and only a solar light source, since shadows cast by a solar light source vary, for example, hour to hour and day to day throughout the year.

The method may continue by initializing (210) surveillance of the coverage area. In this embodiment, counterfeit detection program 112 initializes the surveillance of the coverage area subsequent to establishing at least all the possible object shadow variations utilizing the electronic light sources. Since, counterfeit detection program 112 can continuously establish base shadow measurements for the variation where there is no electronic light source and only a solar light source, counterfeit detection program 112 initially operates utilizing only the established shadow measurements established with the possible variations in the electronic light sources. Counterfeit detection program 112 initializes surveillance of the coverage area according to the receive schedule for light source changes (206).

The method may continue by determining (212) shadow measurements at a defined light source change. Responsive to reaching a scheduled light source change, counterfeit detection program 112 determines shadow measurements for the identified objects in the surveillance coverage area. Continuing from the previous example above, where a schedule that activates the electronic light source in the surveillance area on the hour between the hours of 6 pm to 8 am, Monday through Friday, and every hour after Friday 5 pm to Monday 9 am, counterfeit detection program 112 determines shadow measurements for objects at 6 pm on Monday utilizing electronic light source A. The next scheduled light source change is 7 pm on Monday utilizing electronic light source A and B, followed by 8 pm on Monday utilizing electronic light source A and B again, and so on. Similar to how counterfeit detection program 112 established based shadow measurements for the identified objects, counterfeit detection program 112 utilizes object recognition software known in the art to identify shadows created by the identified objects. Counterfeit detection program 112 identifies the parameters associated with the identified shadows created by the identified objects and determines the shadow measurements based on the identified parameters.

The method may continue by determining (214) whether a similarity threshold was reached. In the event a similarity threshold was not reached ("no" branch, 214), counterfeit detection program 112 determines (216) whether the light source was a defined electronic light source. In the event a similarity threshold was reached ("yes" branch, 214) counterfeit detection program 112 reverts back to determining (212) shadow measurements at a defined light source change.

Counterfeit detection program 112 compares the determined shadow measurements for the objects in the surveillance area with the established base shadow measurements for the objects and determines if there are any deviations between the measurements. Counterfeit detection program 112 identifies acceptable deviations between measurements by utilizing the similarity threshold, where the similarity threshold represents a deviation percentage from the established base shadow measures for a particular parameter. For example, counterfeit detection program 112 established base shadow measurements, where the base shadow measurements include a first parameter for a single line segment measuring 0.65 meters. Counterfeit detection program 112 determined shadow measurements at the defined light source change, where the determined shadow measurements include the first parameters for the single line segment measuring 0.63 meters. Counterfeit detection program 112 utilizes a 5% deviation as a similarity threshold from the established base shadow measurements and as a result, the determined shadow measurements include the first parameters for the single line segment measuring 0.63 meters meets the similarity threshold by not meet or exceed the 5% deviation. Alternatively, if counterfeit detection program 112 utilizes a 3% deviation as a similarity threshold from the established base shadow measurement, then the determined shadow measurements including the first parameter for the single line segment measuring 0.63 meters do not meet the similarity threshold by exceeding the 3% deviation.

In another example, counterfeit detection program 112 established base shadow measurements, where the base shadow measurements include a first parameter for an angle measuring 95 degrees between two line segments. Counterfeit detection program 112 determined shadow measurements at the defined light source change, where the determined shadow measurements include the first parameter for the angle between the two line segments measuring 99 degrees. Counterfeit detection program 112 utilizes a 5% deviation as a similarity threshold from the established base shadow measurements and as a result, the determined shadow measurements include the first parameters the angle between the two line segments measuring 99 degrees meets the similarity threshold by not meet or exceed the 5% deviation. Counterfeit detection program 112 compares each parameter of the determined shadow measurements for the objects in the surveillance area with each parameter of the established base shadow measurements for the objects. Instances where a parameter exists for the established base shadow measurements but not for the determined shadow measurements, counterfeit detection program 112 determines the similarity threshold was not reached ("no" branch, 214).

The method may continue by determines (216) whether the light source was a defined electronic light source. In the event the light source was not a defined electronic light source ("no" branch, 216), counterfeit detection program 112 determines (218) shadow measurements with an electronic light source. In the event the light source was a defined electronic light source ("yes" branch, 216), counterfeit detection program 112 sends (220) a notification to the user.

Counterfeit detection program 112 determines whether the light was a defined electronic light source to ensure variations in a solar light source (e.g., sunlight through fog) did not impact the shadows created by the determined objects in the surveillance area. Counterfeit detection program 112 can examine the received schedule for light source changes for the surveillance coverage area to determine if a solar light source was present at the particular light source change associated with the determined shadow measurements that did not meet the similarity threshold.

The method may continue by determining (218) shadow measurements with an electronic light source. In this embodiment, counterfeit detection program 112 selects an electronic light source from the determined light sources available and determines shadow measurements with the electronic light source to ensure verify the shadow measures have not met the similarity threshold. Counterfeit detection program 112 determines shadow measurements for the identified objects in the surveillance coverage area utilizing the selected electronic light source by identifying the parameters associated with the identified shadows created by the identified objects and determining the shadow measurements based on the identified parameters. Counterfeit detection program 112 reverts back to determining (214) whether a similarity threshold is reached. Counterfeit detection program 112 compares the determined shadow measurements for the objects in the surveillance area utilizing the selected electronic light source from (218), with the established base shadow measurements for the objects utilizing the selected electronic light source from (218). Subsequently, counterfeit detection program 112 determines if there are any deviations between the measurements.

The method may continue by sending (220) a notification to the user. In this embodiment, counterfeit detection program 112 has determined the similarity threshold was not reached utilizing an electronic light source and sends a notification to a client device associated with the user. The notification can include the identified object for which the similarity threshold was not reached. For example, counterfeit detection program 112 can display an image of the identified object with the established base shadow and an image of the identified object with the shadow that did not meet the similarity threshold in the notification being sent to the user. Counterfeit detection program 112 can also highlight a portion of the shadow that did not meet the similarity threshold to signal to the user where the similarity threshold was not meet, along with the parameter value that exceed the set deviation percentage for the similarity threshold. Furthermore, counterfeit detection program 112 can display a set number (e.g., 5 preceding scheduled light source changes) of images of the identified object with the shadow preceding the image of the identified object for which the shadow measurements did not meet the similarity threshold.

Figure 3:
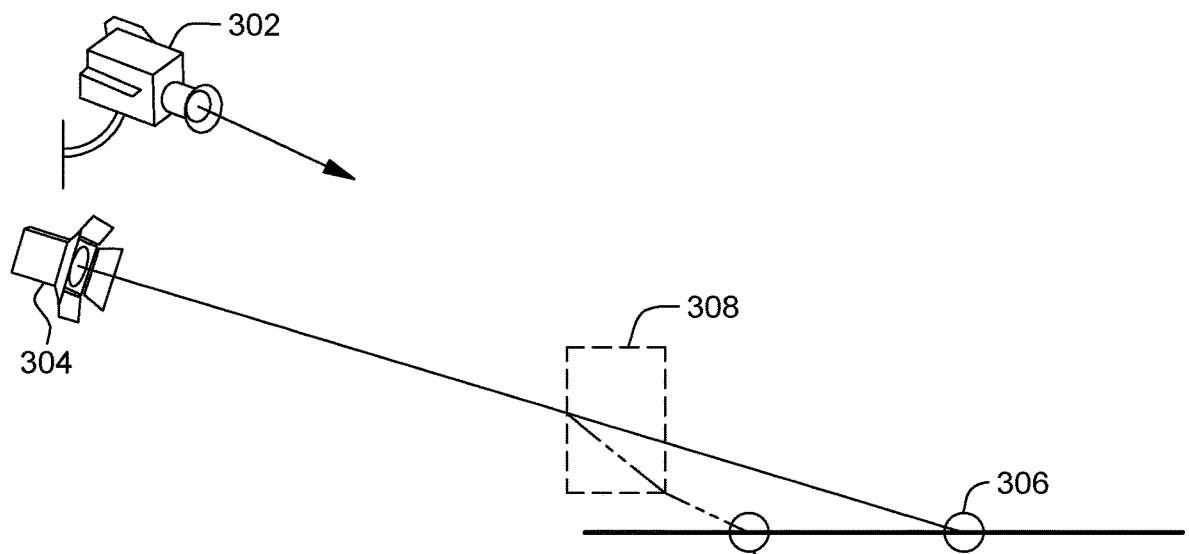
FIG. 3 illustrates an example scenario of a counterfeit detection program identifying a counterfeit occurrence with a transparent object, in accordance with the present invention.

FIG. 3 illustrates an example scenario of a counterfeit detection program identifying a counterfeit occurrence with a transparent object, in accordance with the present invention.

In this example scenario, surveillance camera 302 is directed towards a surveillance area, where electronic light source 304 is projecting a light onto a floor at point 306. Counterfeit detection program 112 identifies electronic light source 304 in the surveillance coverage area but does not identify any objects in the surveillance coverage area (e.g., empty hallway). In this embodiment, electronic light source 304 is a light source with a minimal beam divergence, such as, a laser. Counterfeit detection program 112 establishes illuminated area measurements and base shadow measurements outside the illuminated area created by electronic light source 304. Subsequent to establishing illuminated area measurements and base shadow measurements, counterfeit detection program 112 initializes surveillance of the coverage area. In this embodiment, counterfeit detection program 112 activates and deactivates electronic light source 304 randomly while surveying the coverage area rather than utilizing a time-based schedule set by a user.

As counterfeit detection program 112 activates and deactivates electronic light source 304, counterfeit detection program 112 determines illuminated area measurements and base shadow measurements outside the illumined area created by electronic light source 304. In this example scenario, mirror 308 is utilized to manipulate the surveillance area as captured by surveillance camera 302. A user viewing the surveillance area as captured by surveillance camera 302 would not be able to see mirror 308, as long as mirror 308 is strategically placed to reflect the surrounding area in a way to manipulate the surveillance area as captured by surveillance camera 302. However, with counterfeit detection program 112 activating electronic light source 304, the beam of light is reflected onto the floor at point 310.

Counterfeit detection program 112 determines illuminated area measurements at point 310 and shadow measurements outside the illumined area at point 310. Subsequently, counterfeit detection program 112 determines that a similarity threshold was not reached between illuminated area measurements at point 310 and established illuminated area measurements, as well as, and shadow measurements outside the illumined area at point 310 and established base shadow measurements outside the illuminated area. Counterfeit detection program 112 sends a notification to the user, where the notification includes a message of a counterfeit occurrence and an image of the surveillance area as captured by surveillance camera 302 at the instance when illuminated area measurements at point 310 and shadow measurements outside the illumined area at point 310 were determined.

Figure 4:
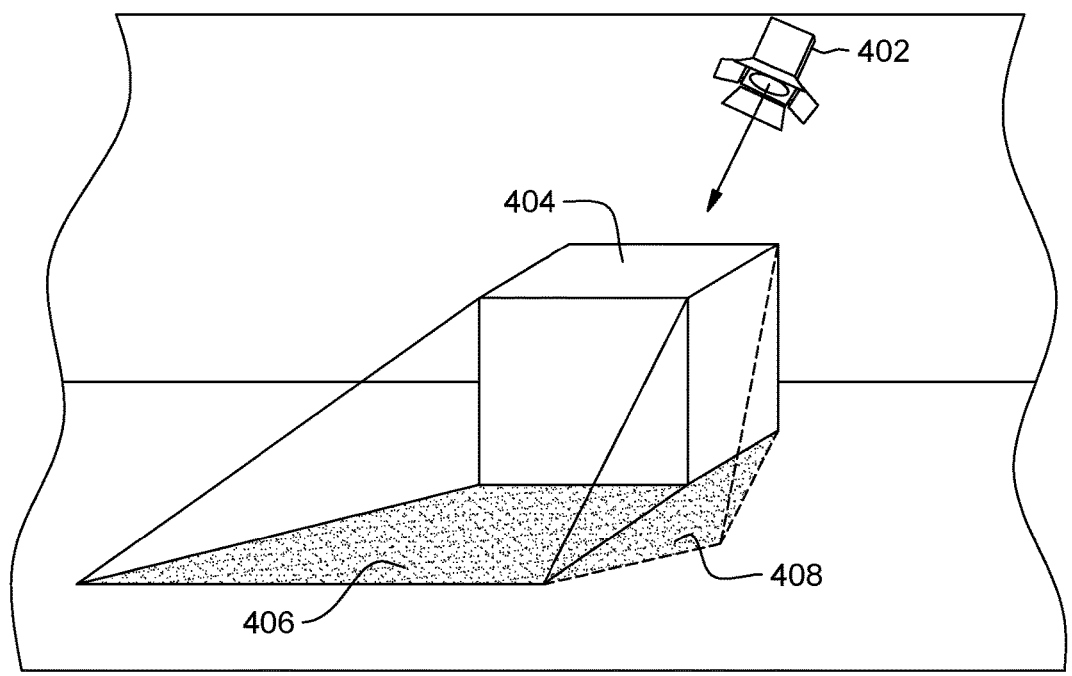
FIG. 4 illustrates an example scenario of a counterfeit detection program identifying a counterfeit occurrence with a multi-dimensional object, in accordance with the present invention.

FIG. 4 illustrates an example scenario of a counterfeit detection program identifying a counterfeit occurrence with a multi-dimensional object, in accordance with the present invention.

In this example scenario, FIG. 4 is a view representative of a surveillance area as captured by a surveillance camera, where the surveillance area is room that includes electronic light source 402 and object 404. Object 404 represents a three dimensional object that casts a shadow when electronic lights source 402 is activated, where the shadow comprises a first shadow portion 406 and a second shadow portion 408. Counterfeit detection program 112 identifies electronic light source 402 and object 404 in the surveillance coverage area. Counterfeit detection program 112 receives a schedule for light source changes for the surveillance coverage area, where a user specifies to activate electronic light source 404 randomly through the day for everyday of the year. Counterfeit detection program 112 establishes base shadow measurements for object 404 utilizing electronic light source 404, where the base shadow measurements are for the first shadow portion 406 and the second shadow portion 408.

Counterfeit detection program 112 initializes surveillance of the coverage area and determines shadow measurements at the first random activation of electronic light source 402. In this example scenario, the three-dimensional object 404 has been replaced with a one to one scale picture of object 404. As a result, the first shadow portion for the picture of object 404 matches the first shadow portion 406 of the three-dimensional object 404 but the second shadow portion for the picture of object 404 is smaller than the second shadow portion 408 of the three-dimensional object 404. Counterfeit detection program 112 determines that a similarity threshold was not reached because at least one parameter for the measurements of the second shadow portion for the picture of object 404 exceeds a deviation percentage for the same parameter of the established base measurements for second shadow portion 408 of the three-dimensional object 404. Counterfeit detection program 112 sends a notification to the user, where the notification includes a message of a counterfeit occurrence and an image of the surveillance area as captured by surveillance camera at the instance when the detection of a counterfeit of object 404 occurred.

In another example, multiple lights sources are installed in the environment, where counterfeit detection program 112 controls the activation and deactivation of the lights. The video surveillance administrator schedules the timing of light source changes based on preference or the software can analyze the external lighting (e.g., sunlight) condition and can dynamically update the expected source light source data accordingly. The video surveillance ecosystem can gather image data from the environment including light levels and source data, as well as, length and direction of shadows of different objects and then compare to what is expected for the different objects. For example, some light sources are enabled in the morning, some are in the afternoon and some are in the evening, so from time to time, direction of light will be changed at the same time illumination level of the lights can also be changed based on time or event based scheduled. This also allows for counterfeit detection program 112 to detect that the light source has changed from what is expected at that particular time. This method allows the invention to detect actual length and direction of shadow with comparison to the expected length and direction of shadow. The deviation between actual and expected explains the movement or manipulation of the object. Counterfeit detection program 112 can measure the length and direction of shadow in the time scale, as the lighting are controlled based on time, so software can compare the expected length and direction of shadow based on the timing.

Counterfeit detection program 112 can compare the base line measurement of what the light should be and if indoors, monitor for any changes from what is expected. If a mirror is placed in front of the image source the expected shadow and light source calculations will not match, therefore triggering a warning. The following are example implementation steps: define two or more light sources in the video surveillance coverage area, schedule changes to all light sources (e.g. light 1, light 2, light 3 etc.), where scheduling can be based on time or events. Counterfeit detection program 112 can consider the external lighting system, for example, periodically switching off all the lights to find the impact of external lights (e.g. Sun light) and can identify the impact of external light in the environment at different times and seasons, while measuring the expected shadow length and direction. Counterfeit detection program 112 can measure shadows from camera image and determine a light source position, compare the direction and length of the measurement with the expected length and direction of shadow. If the delta is beyond a predefined threshold the deviation will be considered a security breach. Additionally, the system can perform one or more manually initiated light source changes to rule out any false positives. If the system continues to register deviation then send notification to users of potential security breach.

Figure 5:
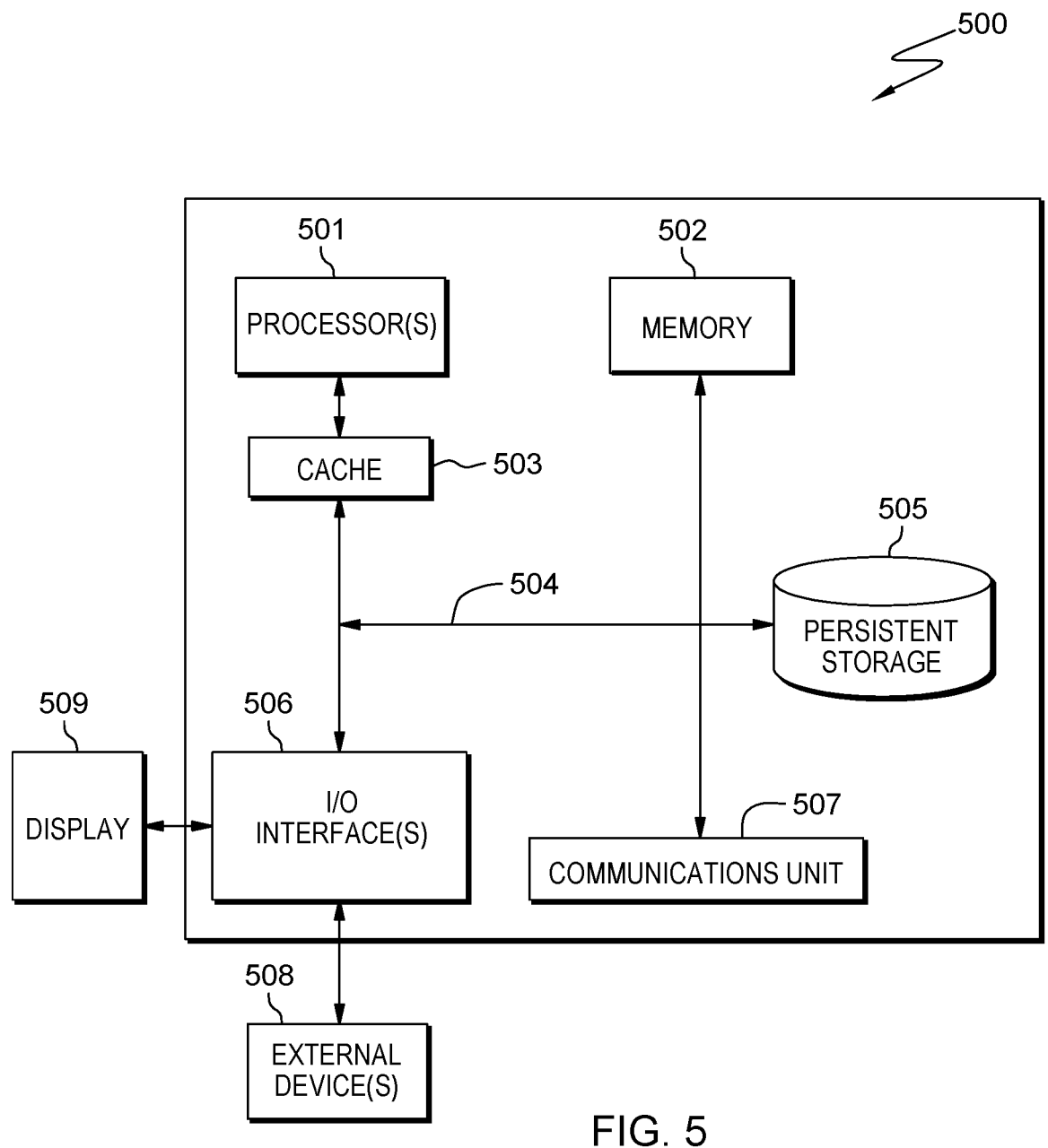
FIG. 5 is a block diagram of components of a computer system, such as the computer server of FIG. 1, in an embodiment in accordance with the present invention.

FIG. 5 depicts computer system 500, where server computer 102 represents an example of a system that includes counterfeit detection program 112. The computer system includes processors 501, cache 503, memory 502, persistent storage 505, communications unit 507, input/output (I/O) interface(s) 506 and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface 506 may provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:

identifying, by one or more processors, a first light source in a camera coverage area that includes one or more objects, wherein the first light source is an electronic light source;

receiving, by one or more processors, a first schedule for one or more light source changes for the camera coverage area, wherein the first schedule for the one or more light source changes includes activating and deactivating the first light source at a particular point in time to create a shadow for each of the one or more objects;

establishing, by one or more processors, a first shadow measurement for a first object out of the one or more objects in the camera coverage area utilizing the first light source and a camera in a first position at a first point in time;

determining, by one or more processors, a second shadow measurement for the first object out of the one or more objects in the camera coverage area utilizing the first light source and the camera in the first position at a second point in time; and responsive to determining the second shadow measurement for the first object does not reach a similarity threshold with the first shadow measurement for the first object based on a first length associated with the first shadow measurement exceeding a percentage of deviation compared to a second length associated with the second shadow measurement, sending, by one or more processors, a first notification to a user that identifies the first object as a potential security breach in the camera coverage area, wherein the first notification displays an image of the first object and highlights a portion of a shadow in the image of the first object associated with the second shadow measurement for the first object that did not reach the similarity threshold.

2. The method of claim 1, further comprising:

identifying, by one or more processors, the first object out of the one or more objects in the camera coverage area, wherein the first object creates the first shadow from which the first shadow measurement is established and the second shadow from which the second shadow measurement is determined.

3. The method of claim 2, further comprising:

identifying, by one or more processors, a second light source in the camera coverage area;

receiving, by one or more processors, a second schedule for one or more light source changes for the camera coverage area, wherein the second schedule for the one or more light source changes include activating and deactivating the second light source at a particular point in time;

establishing, by one or more processors, a third shadow measurement for a third shadow of the first object utilizing the second light source and the camera in the first position at the first point in time;

determining, by one or more processors, a fourth shadow measurement utilizing the second light source and the camera in the first position at the second point in time; and responsive to determining the fourth shadow measurement for the first object does not reach a similarity threshold with the third shadow measurement for the first object, determining, by one or more processors, whether the second light source is an electronic light source.

4. The method of claim 3, further comprising:

responsive to determining the second light source is not an electronic light source, determining, by one or more processors, a fifth shadow measurement for a fifth shadow of the first object utilizing an electronic light source.

5. The method of claim 3, further comprising:

responsive to determining the second light source is an electronic light source, sending, by one or more processors, a second notification to a user, wherein the second notification identifies the first object as a potential security breach and that the second light source is an electronic light source.

6. The method of claim 1, wherein the first notification to the user includes a predetermined amount of images as captured by the camera at the first scheduled one or more light source changes by the first light source for the camera coverage area.

7. A computer program product comprising:

one or more computer readable tangible storage media and program instructions stored on at least one of the one or more storage media, the program instructions comprising:

program instructions to identify a first light source in a camera coverage area that includes one or more objects, wherein the first light source is an electronic light source;

program instructions to receive a first schedule for one or more light source changes for the camera coverage area, wherein the first schedule for the one or more light source changes includes activating and deactivating the first light source at a particular point in time to create a shadow for each of the one or more objects;

program instructions to establish a first shadow measurement for a first object out of the one or more objects in the camera coverage area utilizing the first light source and a camera in a first position at a first point in time;

program instructions to determine a second shadow measurement for the first object out of the one or more objects in the camera coverage area utilizing the first light source and the camera in the first position at a second point in time; and program instructions to, responsive to determining the second shadow measurement for the first object does not reach a similarity threshold with the first shadow measurement for the first object based on a first length associated with the first shadow measurement exceeding a percentage of deviation compared to a second length associated with the second shadow measurement, send a first notification to a user that identifies the first object as a potential security breach in the camera coverage area, wherein the first notification displays an image of the first object and highlights a portion of a shadow in the image of the first object associated with the second shadow measurement for the first object that did not reach the similarity threshold.

8. The computer program product of claim 7, further comprising program instructions, stored on the one or more computer readable storage media, which when executed by a processor, cause the processor to:

identify the first object in the camera coverage area, wherein the first object out of the one or more objects creates the first shadow from which the first shadow measurement is established and the second shadow from which the second shadow measurement is determined.

9. The computer program product of claim 8, further comprising program instructions, stored on the one or more computer readable storage media, which when executed by a processor, cause the processor to:
identify a second light source in the camera coverage area;
receive a second schedule for one or more light source changes for the camera coverage area, wherein the second schedule for the one or more light source changes include activating and deactivating the second light source at a particular point in time;
establish a third shadow measurement for a third shadow of the first object utilizing the second light source and the camera in the first position at the first point in time;
determine a fourth shadow measurement utilizing the second light source and the camera in the first position at the second point in time; and
responsive to the fourth shadow measurement for the first object does not reach a similarity threshold with the third shadow measurement for the first object, determine whether the second light source is an electronic light source.

10. The computer program product of claim 9, further comprising program instructions, stored on the one or more computer readable storage media, which when executed by a processor, cause the processor to:
responsive to determining the second light source is not an electronic light source, determine a fifth shadow measurement for a fifth shadow of the first object utilizing an electronic light source.

11. The computer program product of claim 9, further comprising program instructions, stored on the one or more computer readable storage media, which when executed by a processor, cause the processor to:
responsive to determining the second light source is an electronic light source, send a second notification to a user, wherein the second notification identifies the first object as a potential security breach and that the second light source is an electronic light source.

12. The computer program product of claim 7, wherein the first notification to the user includes a predetermined amount of images as captured by the camera at scheduled one or more light source changes by the first light source for the camera coverage area.

13. A computer system comprising:
one or more computer processors;
one or more computer readable storage media; and
program instructions stored on the computer readable storage media for execution by at least one of the one or more computer processors, the program instructions comprising:
program instructions to identify a first light source in a camera coverage area that includes one or more objects, wherein the first light source is an electronic light source;
program instructions to receive a first schedule for one or more light source changes for the camera coverage area, wherein the first schedule for the one or more light source changes includes activating and deactivating the first light source at a particular point in time to create a shadow for each of the one or more objects;
program instructions to establish a first shadow measurement for a first object out of the one or more objects in the camera coverage area utilizing the first light source and a camera in a first position at a first point in time;
program instructions to determine a second shadow measurement for the first object out of the one or more objects in the camera coverage area utilizing the first light source and the camera in the first position at a second point in time; and
program instructions to, responsive to determining the second shadow measurement for the first object does not reach a similarity threshold with the first shadow measurement for the first object based on a first length associated with the first shadow measurement exceeding a percentage of deviation compared to a second length associated with the second shadow measurement, send a first notification to a user that identifies the first object as a potential security breach in the camera coverage area, wherein the first notification displays an image of the first object and highlights a portion of a shadow in the image of the first object associated with the second shadow measurement for the first object that did not reach the similarity threshold.

14. The computer system of claim 13, further comprising program instructions, stored on the one or more computer readable storage media, which when executed by a processor, cause the processor to:
identify the first object out of the one or more objects in the camera coverage area, wherein the first object creates the first shadow from which the first shadow measurement is established and the second shadow from which the second shadow measurement is determined.

15. The computer system of claim 14, further comprising program instructions, stored on the one or more computer readable storage media, which when executed by a processor, cause the processor to:
identify a second light source in the camera coverage area;
receive a second schedule for one or more light source changes for the camera coverage area, wherein the second schedule for the one or more light source changes include activating and deactivating the second light source at a particular point in time;
establish a third shadow measurement for a third shadow of the first object utilizing the second light source and the camera in the first position at the first point in time;
determine a fourth shadow measurement utilizing the second light source and the camera in the first position at the second point in time; and
responsive to the fourth shadow measurement for the first object does not reach a similarity threshold with the third shadow measurement for the first object, determine whether the second light source is an electronic light source.

16. The computer system of claim 15, further comprising program instructions, stored on the one or more computer readable storage media, which when executed by a processor, cause the processor to:
responsive to determining the second light source is not an electronic light source, determine a fifth shadow measurement for a fifth shadow of the first object utilizing an electronic light source.

17. The computer system of claim 15, further comprising program instructions, stored on the one or more computer readable storage media, which when executed by a processor, cause the processor to:

responsive to determining the second light source is an electronic light source, send a second notification to a user, wherein the second notification identifies the first object as a potential security breach and that the second light source is an electronic light source.

\* \* \* \* \*